US009139433B2

(12) United States Patent
Addiego et al.

(10) Patent No.: US 9,139,433 B2
(45) Date of Patent: Sep. 22, 2015

(54) GOLD CATALYSTS FOR CO OXIDATION AND WATER GAS SHIFT REACTIONS

(75) Inventors: William Peter Addiego, Big Flats, NY (US); Siew Pheng Teh, Ipoh (MY); Jaclyn Seok Kuan Teo, Singapore (SG); Ziyi Zhong, Singapore (SG)

(73) Assignee: Corning Incorporated, Corning, NY (US)

(*) Notice: Subject to any disclaimer, the term of this patent is extended or adjusted under 35 U.S.C. 154(b) by 1146 days.

(21) Appl. No.: 12/711,717

(22) Filed: Feb. 24, 2010

(65) Prior Publication Data
US 2011/0204293 A1 Aug. 25, 2011

(51) Int. Cl.
*B01J 23/00* (2006.01)
*C01B 3/16* (2006.01)
(Continued)

(52) U.S. Cl.
CPC ............... *C01B 3/16* (2013.01); *B01D 53/864* (2013.01); *B01J 23/52* (2013.01); *B01J 23/745* (2013.01);
(Continued)

(58) Field of Classification Search
CPC ...... B01D 53/864; B01D 53/86; B01D 53/94; B01D 2257/502; B01D 2256/22; B01D 2255/106; B01D 2255/20738; B01D 2255/9202; B01D 2255/9207; C01B 31/20; C01B 3/16; C01B 3/583; C01B 3/58; C01B 13/0237; C01B 2210/005; C01B 2203/0283; C01B 2203/044; C01B 2203/047; C01B 2203/1023; C01B 2203/1041; B01J 37/0219; B01J 37/0244; B01J 37/031; B01J 37/10; B01J 37/16; B01J 37/0009; B01J 37/02; B01J 23/00; B01J 23/02; B01J 23/745; B01J 23/8906; B01J 23/96; B01J 23/89; B01J 23/10; B01J 23/345; B01J 35/002; B01J 35/006; B01J 35/04; B01J 35/06; B01J 35/02

See application file for complete search history.

(56) References Cited

U.S. PATENT DOCUMENTS

| 3,953,368 | A | 4/1976 | Sinfelt ...................... 252/466 |
| 5,030,440 | A | 7/1991 | Lywood et al. ............... 426/655 |

(Continued)

FOREIGN PATENT DOCUMENTS

| EP | 1570895 | 9/2005 | ............. B01D 53/94 |
| JP | 2004009011 | 1/2004 | |

(Continued)

OTHER PUBLICATIONS

Tabakova et al (NPL: "Influence of the microscopic properties of the support on the catalytic activity of Au/ZnO, Au/ZrO2, Au/Fe2O3, Au/Fe2O3-ZnO, Au/Fe2O3-ZrO2 catalysts for the WGS reaction", Applied catalysis A: General, , 2000 pp. 91-97).*

(Continued)

*Primary Examiner* — Melvin C Mayes
*Assistant Examiner* — Smita Patel
(74) *Attorney, Agent, or Firm* — Jason A Barron

(57) ABSTRACT

Methods of making supported monolithic gold (Au) catalysts that can be used for generating a hydrogen-rich gas from gas mixtures containing carbon monoxide, hydrogen and water via a water gas shift reaction, and for the removal of carbon monoxide from air at a low reaction temperature via its oxidation reaction are described. Methods of making highly dispersed gold catalysts on washcoated monoliths and the stabilization of monolithic catalyst supports by the addition of a third metal oxide, such as zirconia ($ZrO_2$), lanthanum oxide ($La_2O_3$), or manganese oxide ($Mn_xO_y$). The catalyst supports and/or washcoats may include a variety of transition metal oxides such as alpha iron oxide ($\alpha$-$Fe_2O_3$), cerium oxide ($CeO_2$), $ZrO_2$, gamma alumina ($\gamma$-$Al_2O_3$), or their combinations.

4 Claims, 4 Drawing Sheets

(51) Int. Cl.

| | |
|---|---|
| B01D 53/86 | (2006.01) |
| B01J 23/52 | (2006.01) |
| B01J 23/745 | (2006.01) |
| B01J 23/89 | (2006.01) |
| B01J 23/96 | (2006.01) |
| B01J 35/00 | (2006.01) |
| B01J 35/04 | (2006.01) |
| B01J 35/06 | (2006.01) |
| B01J 37/02 | (2006.01) |
| B01J 37/03 | (2006.01) |
| B01J 37/10 | (2006.01) |
| B01J 37/16 | (2006.01) |
| C01B 3/58 | (2006.01) |
| C01B 13/02 | (2006.01) |
| B01J 37/00 | (2006.01) |

(52) U.S. Cl.
CPC .............. *B01J 23/8906* (2013.01); *B01J 23/96* (2013.01); *B01J 35/002* (2013.01); *B01J 35/006* (2013.01); *B01J 35/04* (2013.01); *B01J 35/06* (2013.01); *B01J 37/0219* (2013.01); *B01J 37/0244* (2013.01); *B01J 37/031* (2013.01); *B01J 37/10* (2013.01); *B01J 37/16* (2013.01); *C01B 3/583* (2013.01); *C01B 13/0237* (2013.01); *B01D 2255/106* (2013.01); *B01D 2255/20738* (2013.01); *B01D 2255/9202* (2013.01); *B01D 2255/9207* (2013.01); *B01D 2256/22* (2013.01); *B01D 2257/502* (2013.01); *B01J 37/0009* (2013.01); *C01B 2203/0283* (2013.01); *C01B 2203/044* (2013.01); *C01B 2203/047* (2013.01); *C01B 2203/1023* (2013.01); *C01B 2203/1041* (2013.01); *C01B 2210/005* (2013.01)

(56) References Cited

U.S. PATENT DOCUMENTS

| | | | | |
|---|---|---|---|---|
| 5,830,425 | A | 11/1998 | Schneider et al. | 423/437.2 |
| 6,969,505 | B2 | 11/2005 | Tonkovich et al. | 423/648.1 |
| 7,160,533 | B2 | 1/2007 | Hagemeyer et al. | 423/655 |
| 7,160,534 | B2 | 1/2007 | Hagemeyer et al. | 423/655 |
| 7,375,051 | B2 | 5/2008 | Kuperman et al. | 502/218 |
| 8,252,257 | B2 | 8/2012 | Iizuka et al. | 423/213.2 |
| 2003/0186804 | A1 | 10/2003 | Wagner et al. | 502/300 |
| 2004/0175491 | A1 | 9/2004 | Hagemeyer et al. | 427/58 |
| 2004/0253498 | A1* | 12/2004 | Northrop et al. | 429/32 |
| 2005/0129589 | A1 | 6/2005 | Wei et al. | 422/177 |
| 2006/0099125 | A1 | 5/2006 | Wu et al. | 423/247 |
| 2006/0128565 | A1 | 6/2006 | Flytzani-Stephanopoulos et al. | 502/439 |
| 2007/0134144 | A1 | 6/2007 | Fajardie et al. | 423/210 |
| 2007/0190347 | A1 | 8/2007 | Fajardie et al. | 428/469 |
| 2007/0293713 | A1* | 12/2007 | Schmidt et al. | 585/658 |
| 2009/0035192 | A1* | 2/2009 | Hwang | 422/170 |
| 2009/0274903 | A1 | 11/2009 | Addiego | 328/337 |
| 2010/0028674 | A1* | 2/2010 | Ochanda | 428/376 |

FOREIGN PATENT DOCUMENTS

| | | | |
|---|---|---|---|
| JP | 2006514878 | 11/2006 | |
| JP | 2008073654 | 10/2009 | |
| WO | WO2004/112958 | 12/2004 | B01J 35/00 |
| WO | WO2007/055663 | 5/2007 | B01J 23/52 |

OTHER PUBLICATIONS

Ruettinger, W., et al., *A new generation of water gas shift catalysts for fuel cell applications*, Journal of Power Sources, 118, 2003, pp. 61-65.

Farrauto, R., *Precious Metal Catalysts Supported on Ceramic and Metal Monolithic Structures for the Hydrogen Economy*, Catalysis Reviews, 49:141-196, 2007, pp. 141-196.

Zanella, R., *Characterization and reactivity in CO oxidation of gold nanoparticles supported on $TiO_2$ prepared by deposition-precipitation with NaOH and urea*, Journal of Catalysis, 222, 2004, pp. 257-367.

Andreeva, D., *Low Temperature Water Gas Shift over Gold Catalysts*, Gold Bulletin, 2003, 35/5, pp. 83-88.

Sajurai, H., et al., *Low-temperature activity of $Au/CeO_2$ for water gas shift reaction, and characterization by ADF-STEM, temperature-programmed reaction, and pulse reaction*, Applied Catalysis A: General, 291, 2005, pp. 179, 187.

Fu, Q., et al., Active Nonmetallic Au and Pt Species on Ceria-Based Water-Gas Shift Catalysts, Science, 301, 2003, pp. 935-938.

Idakiev, V., et al., *Gold catalysts supported on mesoporous zirconia for low-temperature water-gas shift reaction*, Applied Catalysis B. Environmental, 63, 2006, pp. 176-186.

Idakiev, V., et al., *Gold nanoparticles supported on ceria-modified mesoporous titania as highly active catalysts for low-temperature water-gas shift reaction*, Catalysis Today, 128, 2007, pp. 223-229.

Zanalla, R., et al., *Alternative Methods for the Preparation of Gold Nanoparticles Supported on $TiO_2$*, J. Phys. Chem. B., 2002, 106 pp. 7634-7642.

Okumura, M., et al., *Chemical vapor deposition of gold on $Al_2O_3$, $SiO_2$, and $TiO_2$ for the oxidation of CO and of $H_2$*.

Grunwaldt, J.D., *Preparation of Supported Gold Catalysts for Low-Temperature CO Oxidation via "Size-Controlled" Gold Colloids*, Journal of Catalysis, 181, 1999, pp. 223,-232.

Zhong, Z. et al., *A Rapid and Efficient Method to Deposit Gold Particles on Catalyst Supports and Its Application for CO Oxidation a Low Temperatures*, Advance Functional Materials, 2007, 17, pp. 1402-1408.

Zhong, Ziyi, et al., Synthesis of Porous a-$Fe_2O3$ Nanorods and Deposition of Very Small Gold Particles in the Pores for Catalytic Oxidation of CO, Chem. Mater. 2007, 19, 4776-4782.

Bamwenda, G., et al., *The influence of the preparation methods on the catalytic activity of platinum and gold supported on $TiO_2$ for CO oxidation*, Catalysis Letters, 44 1997, pp. 83-87.

Moreau F., et al., *Gold on titania catalysts, influence of some physicochemical parameters on the activity and stability for the oxidation of carbon monoxide*, Applied Catalysis A: General 302, 2006, pp. 110-117.

Chen, M.S., *The Structure of Catalytically Active Gold on Titania*, Science, 306, 2004, pp. 252-255.

Solsona B.E., *Supported gold catalysts for the total oxidation of alkanes and carbon monoxide*, Applied Catalysis, A: General, 312, 2006, pp. 67-76.

Farrauto, R., *Precious Metal Catalysts Supported on Ceramic and Metal Monolithic Structures for the Hydorgen Economy*, Catalysis Reviews, 47, 2007, 141-196.

Nijhuis, T. A., et al., *Preparation of monolithic catalysts*, Catalysis Reviews, 43(4), 2001, pp. 345-380.

Corti, C.W., et al., *Progress towards the commercial application of gold catalysts*, Topics in Catalysis, vol. 44, Nos. 1-2, Jun. 2007, pp. 331-343.

Tabakova, T., et al., *Influence of the microscopic properties of the support on the catalytic activity of Au/ZnO, $Au/ZrO_2$, $Au/Fe_2O_3$, $Au/Fe_2O_3$—ZnO, $Au/Fe_2 O_3$—$ZrO_2$ catalysts for the WGS reaction*, Applied Catalysis, A: General, 202, 2000, pp. 91-97.

Hau, J., et al., *Influence of modifying additives on the catalytic activity and stability of $Au/Fe_2O_3$-MOx catalysts for WGS reaction*, Catalysis Letters, vol. 102, Nos. 1-2, Jul. 2005, pp. 99-108.

Zhang F., et al., *Improved performance of $Au/Fe_2O_3$ catalysts promoted with $ZrO_2$ and $Nb_2O_5$ in the WGS reaction under hydrogen-rich conditions*, Catalysis Letters, vol. 108, Nos. 3-4, May 2006, pp. 131-136.

Borup, R., et al., *Scientific Aspects of Polymer Electrolyte Fuel Cell Durability and Degradation*, Chem. Rev. 2007, 107, pp. 3904-3951.

(56) References Cited

OTHER PUBLICATIONS

Hoflund, G.B., et al., Au/MnO$_x$ catalytic performance characteristics for low-temperature carbon monoxide oxidation, *Applied Catalysis B: Environmental, Elsevier*, vol. 6, No. 2, (Jul. 1995), pp. 117-126.

Kang, Y-M, et al., Preparation of gold in Y-type zeolite for carbon monoxide oxidation, *Applied Catalysis A: General, Elsevier Science*, Amsterdam, NL., vol. 128, No. 1, (Jul. 1995), pp. 53-60.

Corti, C.W., et al., Commercial aspects of gold catalysis, *Applied Catalysis A: General, Elsevier Science*, Amsteram, NL., vol. 291 (Sep. 2005), pp. 253-261.

Romero-Sarria, F., Role of water in the CO oxidation reaction on Au/CeO$_2$: Modification of the surface properties, *Applied Catalysis B: Environmental, Elsevier*, vol. 84, No. 1-2, (Oct. 2008), pp. 119-124.

Japanese Patent Office; Office Action; Sep. 25, 2014; pp. 1-3.

* cited by examiner

GOLD CATALYSTS FOR CO OXIDATION AND WATER GAS SHIFT REACTIONS

BACKGROUND

1. Field of the Invention

Embodiments of the invention relate to methods of preparation of supported monolithic gold (Au) catalysts that are used for generating a hydrogen-rich gas from gas mixtures containing carbon monoxide, hydrogen and water via a water gas shift reaction, and for the removal of carbon monoxide from air at a low reaction temperature via its oxidation reaction. More particularly, embodiments of the invention include methods for the preparation of highly dispersed gold catalysts on washcoated monoliths and the stabilization of monolithic catalyst supports by the addition of a third metal oxide, such as zirconia ($ZrO_2$), lanthanum oxide ($La_2O_3$), or manganese oxide ($Mn_xO_y$). The catalyst supports and/or washcoats may include a variety of transition metal oxides such as alpha iron oxide ($\alpha$-$Fe_2O_3$), cerium oxide ($CeO_2$), $ZrO_2$, gamma alumina ($\gamma$-$Al_2O_3$), or their combinations.

2. Technical Background

Hydrogen ($H_2$) or $H_2$-rich compositions are an indispensable feedstock for many chemical and energy-generating processes, including the refinery processes in petrochemistry and the production of chemicals such as ammonia and methanol. These compositions are also applied in proton exchange membrane (PEM) fuel cells for generating electricity, etc. (see W. Ruettinger, O. Ilinich and R. J. Farrauto, J. Power Sources, 2003, 118, 6-65).

$H_2$ is an environmentally benign material as it is non-poisonous and the use of $H_2$ in many energy-generating processes, such as that in (PEM) fuel cells, does not emit any pollutant, as the sole product of $H_2$ oxidation is water. The use of fuel cells complement environmental regulations that are getting increasingly stringent, whereby cleaner, renewable and non-pollution processes and products are demanded. Moreover, in addition to the growing global demand for $H_2$ production and distribution, the need to obtain higher $H_2$ purity is also increasing. For example, the maximum allowable carbon monoxide (CO) concentration in the $H_2$ gas feed of a PEM fuel cell has dropped from a value of 100 ppm, as required in the 1990s, to the current value of 10 ppm or even 1 ppm. The presence of CO could poison the platinum (Pt) electrodes in the Fuel cells (see W. Ruettinger, O. Ilinich and R. J. Farrauto, J. Power Sources, 2003, 118, 6-65).

$H_2$ is commonly produced by splitting water and steam, reforming of fuels (methane or mixtures of hydrocarbons), or as a by-product of steam reforming of naphtha. The former process is very energy-consuming and is not applicable for large scale production unless cheap electricity is available. Therefore, in industry, most $H_2$ (above 90%) is produced from the steam reforming process, which produces a synthesis gas comprising $H_2$, carbon dioxide ($CO_2$), and CO. Using methane ($CH_4$) as an example, the reaction can be expressed as:

$$2CH_4 + 3H_2O \rightarrow 7H_2 + CO + CO_2$$

The CO concentration is usually above 10% in the synthesis gas, thus, it is still not directly applicable in a fuel cell or in the production of ammonia, etc.

To separate $H_2$ from CO, a reaction called the Water Gas Shift (WGS) reaction is used in industry to convert CO into $CO_2$:

$$CO + H_2O \rightarrow CO_2 + H_2$$

The current industrial WGS process is composed of a two-stage reaction: the high temperature (HT) WGS reaction, using ferro chromium (FeCr) as the catalyst at a working temperature in the range of from 350° C. to 500° C., and the low-temperature (LT) WGS process, using copper zinc (CuZn) as the catalyst at a working temperature in the range of from 200° C. to 260° C. After the steam reforming reaction of a fuel such as methane, the CO concentration in the synthesis gas can be lowered to about 2% to 4% after the HT-WGS reaction, and further lowered to a value between 0.1% and 1% after the LT WGS process (see L. Lloyd, D. E. Ridler, M. V. Twigg, in: M. V. Twigg (Ed.), Catalyst Handbook, seconded, Wolfe Publishing, Frome, 1989, pp. 283-338). This means that the CO conversion in the latter process should be above 50% to 95%, if the CO concentration is around 2% after the HT-WGS reaction. Since the WGS reaction is exothermic and reversible, it is not favorable to reach such a low CO concentration at high temperatures, in accordance with thermodynamics.

Both the FeCr and CuZn catalysts need to be reduced or activated in situ before use (see W. Ruettinger, O. Ilinich and R. J. Farrauto, J. Power Sources, 2003, 118, 6-65). Also, they are pyrophoric after activation, i.e. they spontaneously generate heat to dangerously high temperatures when exposed to air. Unfortunately, residential or mobile fuel cell systems are often operated with frequent start/stop operations. Therefore, the existing industrial FeCr and CuZn catalysts clearly cannot meet these dynamic requirements, as they will then experience unacceptable rapid deactivation under these operation conditions due to their pyrophoric nature (see R. J. Farrauto et. al. Catal. Rev. 2007, 49, 141-196; and R. Borup, J. Meyers et. al. Chem. Rev. 2007, 107, 3904-3951). In addition, in the production and handling process, as well as the post-reaction treatment, of the chromium-promoted iron catalyst, the presence of chromium is a potential danger to health, and a problem to the environment.

Other developed catalyst systems usually need a higher reaction temperature to convert CO into $CO_2$ via the WGS reaction. For instance, U.S. Pat. No. 5,030,440, reports a Pt and Pt-containing catalyst formulation which needs a reaction temperature above 550° C., while U.S. Pat. No. 5,830,425 discloses a chromium-free iron/copper catalyst that requires a reaction temperature above 300° C. Some other metals such as cobalt (Co), ruthenium (Ru), Palladium (Pd), Rhodium (Rh) and nickel are also tested for WGS reaction, and methanation of CO ($CH_4$ formation from CO and $H_2$) is usually observed as described in U.S. Pat. No. 7,160,533. Furthermore, all of these catalysts cannot fulfill the requirement for frequent stop/start operations.

Therefore, in recent years, research efforts have been made to further lower the WGS reaction temperature, while maintaining the high catalytic activity. It is not only because the low reaction temperature favors a higher CO conversion, according to the thermodynamic equilibrium of the WGS reaction, but also the necessity to lower the temperature of the $H_2$-stream fed to a PEM fuel cell to be as close as that of the operation temperature of the PEM fuel cell, which is around 80° C. Also, as mentioned above, the new WGS catalysts should be able to endure the repeated start/stop operations.

It is reported that supported Au catalysts on $\alpha$-$Fe_2O_3$ exhibited good WGS activity in the temperature range of from 120° C. to 200° C., at a gas hourly space velocity (GHSV) of 4000 h$^{-1}$ (see D. Andreeva, V. Idakiev, T. Tabakova, A. Andreev, J. Catal. 158 (1996), 354-355). Some other supported Au catalysts on $CeO_2$, $TiO_2$ and $ZrO_2$ were later reported to be used in LT WGS reaction (see D. Andree, Gold Bulletin, 2002, 35, 82-88; H. Sajurai, T. Akita, S. Tsubota, M. Kiuchi, M. Haruta, Appl. Catal. A: General, 2005, 291, 179-187; Q. Fu, H. Saltsburg, M. Flytzani-Stephanopoulos, Science, 2003, 301, 935-

907). The use of mesoporous catalyst supports such as mesoporous $ZrO_2$ can further improve the catalytic performance of the catalysts (see V. Idakiev, T. Tabakova, A. Naydenov, Z. Y. Yuan and B. L. Su, Appl. Catal. B. Environ. 63, 178 (2006); V. Idakiev, T. Tabakova, K. Tenchev, Z. Y. Yuan, T. T. Ren and B. L. Su, Catal. Today 128, 223 (2007). A recent U.S. Pat. No. 7,375,051, describes Au supported on sulfated $ZrO_2$ for WGS reaction. At 200° C. and at a GHSV of 4000 $h^{-1}$, the CO conversion could reach 96%, and after a 20 hr reaction, it was slightly decreased to about 95%. Clearly, the Au catalyst is promising for WGS reaction at low reaction temperatures. Other examples can be seen in US Patent Application No. 2006/0128565A1, where Au/Lanthanum oxides were used for WGS reaction.

The methods developed for the preparation of the supported Au catalysts include the co-precipitation (CP) method and deposition-precipitation (DP) methods (see M. Haruta, S. Tsubota, T. Kobayashi, H. Kageyama, M. J. Genet, B. Delmon, J. Catal. 1993, 144, 175) in which $HAuCl_4$ is used as the precursor, and sodium carbonate ($Na_2CO_3$), sodium hydroxide (NaOH) or urea (see R. Zanalla, S. Giorgio, C. R. Henry and C. Louis, J. Phys. Chem. B. 2002, 106, 7634) as the precipitating agents respectively, chemical vapor deposition method (see M. Okumura, S. Nakamura, S. Tsubota, T. Nakamura, M. Azuma, M. Haruta, Catal. Lett., 1998, 51, 53-58), and a Au-colloid-based two-stage method employing tetrakis (hydroxmethyl)-phosphonium chloride (THPC) as the reducing and capping agent (see D. Grunwaldt, C. Kiener, C. Wogerbauer, A. Baiker, J. Catal. 1999, 181, 223-232), and a sonicated-assisted method (Z. Zhong et al, Patent Application No. WO2007/055663 and Z. Zhong, J. Lin, S. P Teh, J. Teo, F. M. Dautzenberg, Adv. Funct. Mater, 2007, 17, 1402-1408), etc.

One factor that determines the catalytic performance of the supported Au catalysts for CO oxidation is the Au particle size. The Au particles should be below 5 nm, and for CO oxidation, the optimum Au particle size should be about 3 nm (see M. Haruta et al, Catal. Lett. 1997, 44, 83; M. S. Chen, D. W. Goodman, Science, 2004, 306, 252). The above methods in most cases can control Au particles below 5 nm. A number of supported Au catalysts (in powder form) have been prepared for CO oxidation (or selective oxidation of CO in the presence of $H_2$) by these methods such as those described in US Patent Application No. 2006/0165576, which reported the use of Au supported on $Al_2O_3$, $Fe_2O_3$ etc, in the selective oxidation of CO; US Patent Application No. 2007/0190347 A1 which describes Au/$CeO_2$ catalyst applied in CO oxidation in air for treating tobacco smoke; and WO 2007/055663 A1 which also describes supported Au catalysts used in CO oxidation.

However, for these powder catalysts, when they are packed into bed particulate form, a large pressure drop will be created during the catalytic reaction, thus limiting a high speed flow of reactant gases. Moreover, the catalyst beds are vulnerable to severe breakage resulting from stresses that are induced by the frequent start and stop operations required for mobile fuel cell systems (see R. J. Farrauto, Y. Liu, W. Ruettinger, O. Ilinich, L. Shore, T. Giroux, Catal. Rev. 2007, 49, 141-196).

SUMMARY

It would be advantageous to develop a supported Au monolithic catalyst which could be used in WGS reactions and CO oxidation reactions. It would also be advantageous to obtain or maintain a small Au particle size, and be able to tightly adhere the Au catalysts onto the washcoat or the wall of the monolith. Further, it would be advantageous to increase the stability of Au catalysts.

Using monolithic catalysts (structured catalysts) can provide a practical solution to such problems as described above in the Technical Background. The monolithic catalyst (ceramic materials herein) comprise single blocks of small (0.5 mm-4 mm channel diameter) parallel channels with a catalytic wall, which allows high flow rates of reactant gases and can effectively avoid the pressure-buildup in the reactor. Since monolithic walls have good mechanical strength, the catalyst bed deposited on the wall is expected to withstand the stress resulting from frequent switching on/off operations.

In addition to the potential application in WGS reactions, the unique ability of low temperature catalysis of the supported Au catalysts opens up new opportunities for their applications in pollution and emission control and safety. For example, the typical three-way Pt catalysts on monoliths are being used for emission control (for CO and HC conversion and deNOX reaction) under high temperature and high space velocities (SV), but this catalyst cannot work properly below 300° C. The introduction of monolithic supported Au catalysts potentially can thus be beneficial for such environmental catalysis at lower temperatures such as the low-temperature oxidation of volatile organic compounds (VOC) and CO. These monolithic supported Au catalysts can also be integrated with an air conditioner to clear toxic pollutants such as CO in indoor environment. Therefore, CO oxidation at low temperatures under high SV may be possible.

One embodiment is an article comprising a ceramic monolith, and a supported Au catalyst layer disposed on the ceramic monolith.

Another embodiment is a method for providing a supported Au catalyst on a ceramic monolith, the method comprising applying a washcoat comprising a Au catalyst to a ceramic monolith to form the supported Au catalyst on the ceramic monolith.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiment(s) of the invention and together with the description serve to explain the principles and operation of the invention.

BRIEF DESCRIPTION OF THE DRAWINGS

The invention can be understood from the following detailed description either alone or together with the accompanying drawings.

DETAILED DESCRIPTION

Figure 1A:
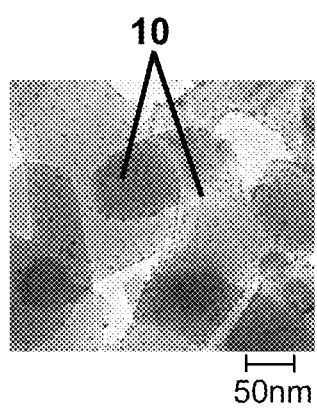
FIGS. 1A, 1B, and 1C are transmission electron microscope (TEM) images showing the effects of treatments with ethylene glycol monoethyl ether (EGME), or an EGME/Fe $(NO_3)_3$ mixture in the Au/$\alpha$-$Fe_2O_3$ supported catalyst prepared by the sonochemical method on the adherence of the Au powder catalyst.

Reference will now be made in detail to various embodiments of the invention, an example of which is illustrated in the accompanying drawings.

The term "monolith" as used herein means a shaped body comprising inner passageways, such as straight or serpentine channels and/or porous networks that would permit the flow of a gas through the body. The monolith comprises a dimension in the flow-through direction of at least 1 cm, at least 2 cm, at least 3 cm, at least 4 cm, at least 5 cm, at least 6 cm, at least 7 cm, at least 8 cm, at least 9 cm, or at least 10 cm from the inlet to the outlet.

In one embodiment, the monolith has a honeycomb structure comprising an inlet end, an outlet end, and inner channels extending from the inlet end to the outlet end. In one embodiment, the honeycomb comprises a multiplicity of cells extending from the inlet end to the outlet end, the cells being defined by intersecting cell walls. The honeycomb could optionally comprise one or more selectively plugged honeycomb substrate cell ends to provide a wall flow-through structure that allows for more intimate contact between the gas and cell walls.

Embodiments described herein provide an effective approach to the preparation of supported Au catalysts on monoliths and the catalytic applications of these catalysts for CO oxidation and WGS reactions.

Embodiments described herein provide the detailed effects of various treatments on the supported Au catalyst and on the adherence of the Au catalyst comprising Au powder to the monolith. In the preparation of the washcoated Au catalyst, the powder Au catalyst can be prepared by a sonochemical, CP, or DP method; the powder Au catalyst can be Au particles supported on a metal oxide or their composites; the powder catalyst, in one embodiment, is coated onto the monolith by making use of a solvent and a binder such as an organic salt, an inorganic salt, a metal hydroxide, or their combinations. In one embodiment, the monolith is a cordierite honeycomb.

One embodiment is an article comprising a ceramic monolith, and a supported Au catalyst layer disposed on the ceramic monolith. Another embodiment is a method for providing a supported Au catalyst on a ceramic monolith, the method comprising applying a washcoat comprising a Au catalyst to a ceramic monolith to form the supported Au catalyst on the ceramic monolith. For example, the supported Au catalysts were first prepared in powder form, then they were washcoated onto the monolith and used both as the washcoat and as the supported Au catalyst layer together in one step (referred to as a one-stage washcoating process or Scheme 1). Embodiments described by FIGS. 1A-3C were made according to Scheme 1. During the monolithic catalyst (ML catalyst) preparation study, the Au particles underwent various treatments such as stirring in solutions containing different solvents and binders, and these solutions had various pH values. As mentioned above, the small Au particles size is a prerequisite for good catalytic activity, thus the optimized conditions should have minimum influence on the Au particles size. The influence of these factors on the Au particle size is investigated and evaluated by electron transmission microscopy (TEM) measurement (to observe the Au particle size). Such catalysts were only studied and used in CO oxidation reaction.

In one embodiment, the Au catalyst is a powder comprising Au particles. In one embodiment, the supported Au catalyst layer comprises Au particles. The Au particles, according to some embodiments, have an average diameter of 10 nm or less, for example, in the range of from 2 nm to 5 nm.

In another embodiment, the article further comprises a washcoat layer disposed on the monolith, wherein the supported Au catalyst layer is disposed on the washcoat layer. According to one embodiment, applying the washcoat comprises applying a first washcoat comprising a catalyst support to the monolith to form a catalyst support layer; and then applying a second washcoat comprising the Au catalyst to the catalyst support layer to form the supported Au catalyst on the monolith (referred to as a two-stage washcoating process or Scheme 2). Embodiments described by FIGS. 6A-6D were made according to Scheme 2. For example, in the two-stage process for the preparation of the monolithic catalyst, an α-Fe$_2$O$_3$ support was first washcoated on the monolith wall. Then a freshly prepared Au powder catalyst was coated onto the priorly washcoated monolith.

Figure 4:
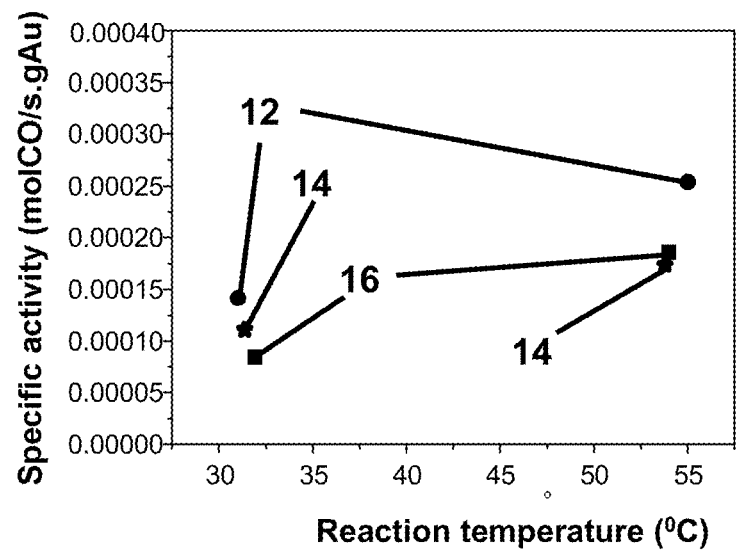
FIG. 4 is a plot showing the CO oxidation activity of 5% Au sono/Fe$_2$O$_3$ powder, its residue and monolith samples, according to one embodiment.
Figure 5:
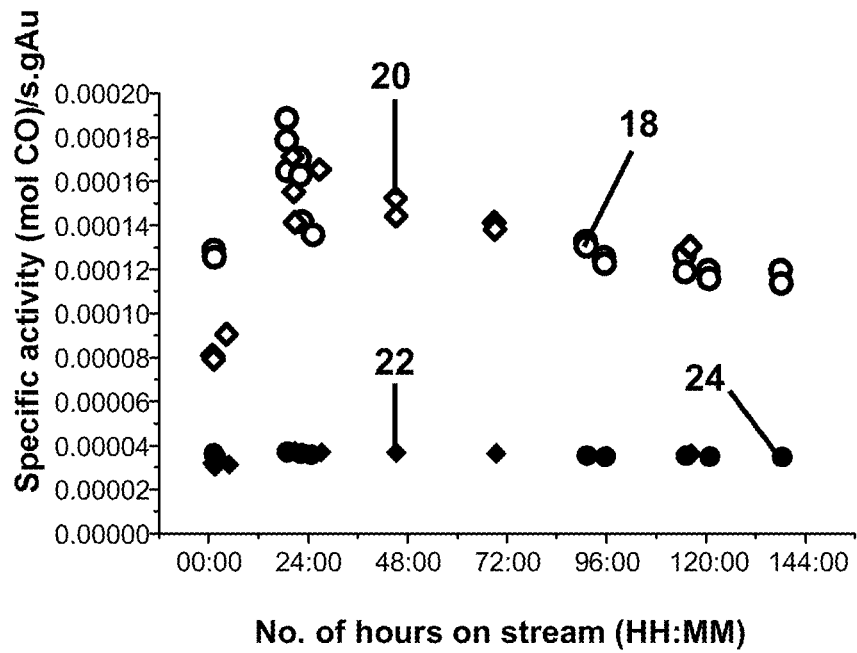
FIG. 5 is a plot of the CO oxidation catalytic activity of the 5% Au/α-Fe$_2$O$_3$ powder catalyst and its washcoated monolithic catalyst, according to one embodiment.

In embodiments described by FIGS. 4 and 5, the catalytic performance of the ML catalysts prepared by Scheme 1 and Scheme 2 for CO oxidation (1% CO in air) was compared with the corresponding powder catalyst.

In embodiments described by FIGS. 7, 8, and 9A-9D, ML catalysts prepared for LT-WGS reaction were evaluated by comparing the catalytic performance of the ML catalyst, prepared by Scheme 2 with the powder catalyst, and the disclosed methods to stabilize the catalyst supports.

In one embodiment, the washcoating method comprises a two-stage process for washcoating various powder Au catalysts on monolith, in which the catalyst support is first washcoated onto the monolith, then the powdered Au catalyst is washcoated again on the pre-coated monolith.

In one embodiment, the catalyst support can be $\alpha$-$Fe_2O_3$ nanofibers which are prepared by a templating method using tetraethylammonium hydroxide (TEAOH) or tetramethylammonium hydroxide (TMAOH), or a combination thereof as the template. According to one embodiment, tetramethylammonium hydroxide is used as the template. The preparation by making use of TMAOH as the template can be done at room temperature and the reaction can be shortened to 5 minutes, if microwave irradiation is used.

In another embodiment, the $\alpha$-$Fe_2O_3$ nanofibers can be doped with a second metal oxide (MO) such as $ZrO_2$, $La_2O_3$ or $Mn_xO_y$, to stabilize the catalyst active phase and the Au nanoparticles; In the preparation of the composite catalyst supports, tetraethylammonium hydroxide (TEAOH) or tetramethylammonium hydroxide (TMAOH) can be used as template.

In another embodiment, the prepared supported Au catalyst monoliths can be used for low-temperature oxidation of CO and LT-WGS reactions. The monolithic catalysts have almost the same level of catalytic activity for these two reactions as that of the powdered Au catalysts; The WGS reaction temperature can be lowered to ca. 160° C. with a CO conversion of above 80% for GHSV in the range of ca. 0-1000 $h^{-1}$ (5000-8000 $h^{-1}$ to the same amount of powdered Au catalyst. In LTS-WGS, the CO conversion remains above 60% after 450 hr of reaction; while in CO oxidation, the CO conversion remains above 80% after 400 hrs reaction, and the catalytic activity can be regenerated by heating in air at 300° C.

In another embodiment, the co-precipitation (CP) method and deposition-precipitation (DP) prepared Au catalysts do not need an activation for CO oxidation and WGS reaction; while the sonochemically prepared catalyst should be calcined at 300° C. in air before use.

In one embodiment, the catalyst support is a metal oxide or metal hydroxide or any mixtures thereof, e.g., $Fe_2O_3$, which is commercially available or by self-synthesis.

The monolith used can be a cordierite or any other ceramic honeycomb having parallel channels of equal size. An example will be a cordierite monolith with 600 channels per square inch (cpsi), where each square channel has a wall length of 0.0408 inch or 0.1037 cm on each side.

In one embodiment, the deposition methods of Au on the catalyst support includes the CP, DP or sonochemical method (see detailed description of the invention sections a) to c)).

Binder is a chemical compound whose hydrolyzed product is used to bind the supported Au catalyst particles to the washcoat on the monolith. For instance, metal salts such as nitrates, organic salts, hydroxides can be used as binders, depending on particular cases. In washcoating Au/$\alpha$-$Fe_2O_3$, $Fe(NO_3)_3$, Fe gluconate (their in situ hydrolyzed products), $Al(OH)_3$, $Ti(OH)_4$, $Fe(OH)_3$ can be used as binders.

Solvents can include water or any polar organic solvents or their mixtures, which are used to form a slurry with the supported powder Au catalyst and to function with the binder to facilitate the formation of washcoat.

Alternative procedures were tried to prepare the washcoated ML catalyst, e.g., by first washcoating the catalyst support $Fe_2O_3$ on the monolith then depositing Au particles on the washcoat by CP, DP and the Sonochemical method, or by absorbing $HAuCl_4$ solution onto the washcoated monolith first, followed by its reduction. However, they are not successful in obtaining Au particles with small size and in obtaining a homogeneously distributed washcoat layer on the monolith.

One embodiment is a method for producing a hydrogen-rich gas at low reaction temperature, which comprises contacting a CO-containing gas (syngas) with a Au monolithic catalyst according to the embodiments described herein. The reactant gas can contain CO, $H_2$, $CO_2$, and $H_2O$. The reaction temperature, in one embodiment, is in the range of 100 to 250° C. According to one embodiment, the catalyst does not need any activation pretreatment. The GHSV, in one embodiment, is in the range of from 100 to 10000 $h^{-1}$. The CO concentration in the gas stream is in the range of 0-10% by volume. The CO is converted to $CO_2$ in one embodiment. The conversion of CO, in one embodiment, is in the range of from 30% to 100%.

Another embodiment is a method for producing a clean air by removing CO or other organic pollutants in the air using an Au monolithic catalyst according to the embodiments described herein. The reaction temperature, in one embodiment, is in the range of 0 to 100° C. The GHSV, in one embodiment, is in the range of from 100 to 500000 $h^{-1}$. In one embodiment, CO is present in air. In one embodiment, CO is oxidized into $CO_2$.

The conversion of CO, in one embodiment, is in the range of from 70% to 100%.

According to some embodiments, for both methods for producing a hydrogen-rich gas at low reaction temperature and methods for producing a clean air by removing CO or other organic pollutants, the monolithic Au catalyst preserves 60% of its conversion after 450 hrs on stream (the time the gas stream is in contact with the supported Au catalyst monolith).

EXAMPLES

It should be understood that the examples described below are provided for illustrative purpose only and do not in any way define the scope of the invention. These examples can be divided into four parts.

The CP and DP methods are mainly refer to F. Moreau, G. C. Bond, Appl. Catal. A: General, 2006, 302, 110-117 and B. E. Solsona, T. Garcia, C. Jones, S. H. Taylor, A. F. Carley, G. J. Hutchings, Appl. Catal. A: General, 2006, 312, 67-76) and some experimental procedures are given below:

a) The detailed procedures of the CP method to synthesize 3% Au/$Fe_2O_3$:
1) 5.0 g $Fe(NO_3)_3$ was added to 125 ml of water (ultra-pure water).
2) The solution was stirred for a while at 80° C., after which 0.52 ml of 0.58M $HAuCl_4$ was added.
3) 0.25M of $Na_2CO_3$ was added drop by drop until pH=8.2 was reached, with the temperature kept at 80° C. forming a slurry.
4) The slurry was then filtered and washed with 80° C. DI water several times.
5) The precipitate was then dried at 120° C. overnight.

The detailed procedures of the DP method to deposit 3% Au on pre-made $Fe_2O_3$ or $Fe_2O_3$.$ZrO_2$ support are as follows:
1. To 0.50 g of $Fe_2O_3$ or $Fe_2O_3$.$ZrO_2$ support, 8 ml of water (ultra-pure water) was added.
2. 9.0 ml of 0.01M $HAuCl_4$ was added to the mixture and stirred.
3. 0.25M $Na_2CO_3$ was added dropwise to the slurry until the pH reach a value of 8.5-8.9.
4. The mixture was left to stir for 10 min and the pH was re-checked. If the pH fell below 8.0, more $Na_2CO_3$ was added. If it remained above 8, the mixture was left to stir.
5. The slurry was then aged in stirring for 2 hrs and the pH rechecked after 2 hrs.
6. The solid was then washed with water via centrifugation and dried at 120° C. for 2 hr.

c) The detailed procedures for synthesizing supported Au (3 wt %) powder catalysts by the sonochemical method (PCT Publication WO2007/055663 A1 and Z. Zhong et al, Adv. Funct. Mater, 2007, 17, 1402-1408):
1. In a typical catalyst preparation, 10 ml DI water was added to 0.50 g α-$Fe_2O_3$, followed in sequence by 3.0 ml of 0.01M $HAuCl_4$ and 3.0 ml of 0.01M Lysine (Lys).
2. The pH value of the suspension was then adjusted to 5-6 with 0.10M NaOH.
3. The suspension was subjected to sonication for 20 seconds, and during the period, freshly prepared $NaBH_4$ (0.1M, 5-10 time of Au molar number) was injected instantly. The suspension solution turned dark immediately
4. The pH value at the end-point was measured, and the catalyst was washed with DI water for 4 times using centrifugation, before drying at 60° C.

d) The detailed procedures for synthesizing fibrous $Fe_2O_3$ or $Fe_2O_3.ZrO_2$ (equimolar) by the templating method using Tetralethylammonium Hydroxide (25 wt %) or Tetramethylammonium Hydroxide (20 wt %)
1. Equimolar amounts of $Fe(NO_3)_3.9H_2O$ (~1.2 g) and $ZrO(NO_3)_2.xH_2O$ (~0.80 g) were weighed out and added to an autoclave. If only $Fe_2O_3$ is required, 2 g of $Fe(NO_3)_3.9H_2O$ was weighed. Zirconium precursor was first dissolved in small amount of water (1.5 ml in this case) followed by the addition of Iron precursor and stirred well, before it was poured into the autoclave. (x=2, dehydrate is normally used unless specified otherwise)
2. Tetramethylammonium Hydroxide (20 wt %) (32 ml) or Tetramethyl ammonium Hydroxide (25 wt %) was then added to the precursors and the mixture stirred briefly.
3. The autoclave was sealed and placed in an 80° C. oven and heated for 3 hrs.
4. After it was cooled down overnight, the precipitated solid was then washed with water and acetone several times via centrifugation;
5. The washed solid was dried at 60° C. and calcined at 400° C. for 3 hr.

e) The detailed procedures for synthesizing $Fe_2O_3.ZrO_2$ by a modified templating method using Tetralethylammonium Hydroxide (25 wt %)
1. $Fe(NO_3)_3.9H_2O$ and $ZrO(NO_3)_2.xH_2O$ weighed according to the desired Fe:Zr molar ratio. Zirconium precursor was first dissolved in small amount of water followed by the addition of Iron precursor and stirred well, before it was poured into the autoclave. (x=2, dehydrate is normally used unless specified otherwise)
2. The above mixture was added dropwise into a stirring solution of Tetraethylammonium Hydroxide (20 wt %) and the mixture was stirred well.
3. The autoclaved was sealed and placed in an 80° C. oven and heated for 3 hrs.
4. After it is cooled down overnight, the precipitated solid was then washed with water and acetone several times via centrifugation
5. The washed solid was dried at 60° C. and calcined at 400° C. for 3 hr.

f) Procedures of washcoating using ethylene glycol monoethyl ether (EGME) as the solvent with a binder.
1. 2.1 g $Fe(NO_3)_3.9H_2O$ was dissolved in 16 g ethylene glycol monoethyl ether (EGME) to form a 0.35M solution. Equivalent amounts were weighed if Fe Gluconate or $Fe(OH)_3$ was used instead. EGME combines with the freshly formed $Fe(OH)_3$ to bind the powder catalyst with the wall of the monolith.
2. 4.0 g 5% Au/α-$Fe_2O_3$ powder catalyst (prepared by the sonochemical method, CP or DP method) was added into the solution to form a slurry. The slurry was stirred at room temperature for 10 hrs.
3. A piece of monolith was then dipped into the slurry for 1-3 min. The wetted monolith is then blown with air to remove the excess slurry. This procedure could be repeated for 2-3 times.
4. The monolith is then dried in oven at 80° C.
5. Redipping was done as necessary g) Procedures in washcoating process using iron gluconate as binder:
1. 0.43 g iron gluconate was added to 0.8 g of water and 2.08 g EGME
2. Mixture was stirred to mix the iron gluconate thoroughly first
3. 0.8 g 1% Au/$Fe_2O_3$ was then added to the mixture
4. Mixture was stirred for 6 hr.
5. Coating was then done once on a reactor sized (1 cm long) monolith by dipping it into the slurry for about 1-2 min, followed by blowing off the excess coating in $N_2$ and dried in oven at 80° C.
6. Redipping was done as necessary h) Procedures in washcoating process using $Fe(OH)_3$ as binder
1. 0.43 g of $Fe(NO_3)_3$ was added to about 2 ml water.
2. 1.05 ml $NH_4OH$ was added to a pH of ~8 to precipitate $Fe(OH)_3$, using NaOH or $NH_4OH$.
3. Slurry was then washed via centrifugation with DI water for at least 6 times before drying at 60° C. overnight.
4. Dried $Fe(OH)_3$ was then ground.
5. 0.113 g of $Fe(OH)_3$ was added to 0.8 g water (pH=ca.7) and 2.08 g EGME and dispersed with assistance of ultrasonication.
6. 0.8 g 1% Au.$Fe_2O_3$ was then added to the mixture and stirred for 40 min or 3 hr.
7. Coating was then done once on a reactor sized (1 cm long) monolith by dipping it into the slurry for about 1-2 min, followed by blowing off the excess coating in $N_2$. Monolith was dried at 80° C.
8. Re-dipping of the monolith was carried out as necessary.

Optimized two-stage preparation procedures for producing supported Au powder catalyst on ML (in our previous procedures, we first prepared dried Au/$Fe_2O_3$ powder, then mixed it with $Fe(NO_3)_3$ and EGME for washcoating).
1. EGME+$Fe(NO_3)_3$+α-$Fe_2O_3$ were mixed and the mixture was stirred overnight;
2. A blank monolith was dipped into the slurry for a few times to form a washcoat, dried and calcined at 400° C. for 1 h.
3. Sonochemical or DP preparation of 3% Au/$Fe_2O_3$ was prepared.
4. The deposited catalyst was washed with $H_2O$ for several times and then added to EGME (for sonochemical) or water (for DP). The slurry was stirred for about 30 min. The pre-washcoated ML in the procedure (1) was dipped into the slurry for 3 min, and the wetted monolith is then blown with air to remove the excess slurry and dried at 80° C. for at least 10 min.
5. Redipping was done as necessary to get the desired weight The initial phase of the research involved the use of the 1 stage preparation of monolith catalysts in CO oxidation. In studying this particular preparation process (Scheme 1), the supported powder Au catalyst was given a series of treatments, e.g., exposed to various solutions and binders. While these treatments have different effects on the Au particles, these effects are also dependent on the preparation method for the powdered Au catalysts.

In the washcoating process, the use of ethylene glycol monoethyl ether EGME and $Fe(NO_3)_3$ is to generate surface OH groups on the ML support and the powder Au catalyst or act as a complexing agent so as to enhance the adherence of the powder Au catalyst to the wall of monolith. The influence of these two chemicals on the Au particles in the powder Au/$Fe_2O_3$ catalyst was investigated.

Figure 1B:
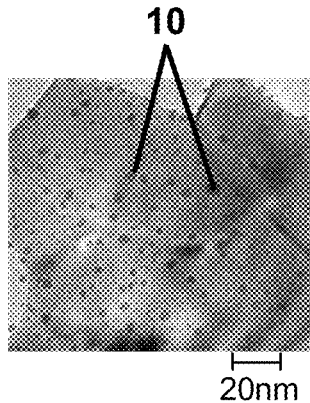
Figure 1C:
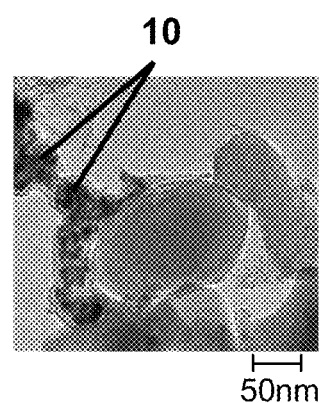

FIGS. 1A, 1B, and 1C are transmission electron microscope (TEM) images showing the effects of treatments with ethylene glycol monoethyl ether (EGME), or an EGME/$Fe(NO_3)_3$ mixture in the Au/$\alpha$-$Fe_2O_3$ supported catalyst prepared by the sonochemical method on the adherence of the Au powder catalyst. TEM images for the 5 wt % Au/$\alpha$-$Fe_2O_3$ catalyst (calcined at 300° C. for 1 h prior to the analysis) before and after various treatments were taken: FIG. 1A shows the supported Au catalyst 10 before any treatment, FIG. 1B shows the supported Au catalyst 10 treated with EGME for 10 hrs, and FIG. 1C shows the supported Au catalyst 10 treated with a mixture of EGME and $Fe(NO_3)_3$ for 10 hrs. The Au particles are highly dispersed in the catalyst before the treatment, and there is no obvious change for Au particles after the treatment with ethylene glycol monoethyl ether (EGME). However, there is severe Au aggregation after the treatment with the mixture of EGME and $Fe(NO_3)_3$. The observation of the Au aggregation behavior was further confirmed when the catalyst was treated solely with $Fe(NO_3)_3$ (the TEM results not shown here).

Further experiments done by treating the supported Au catalyst with $Fe(NO_3)_3$ aqueous solution at pH 3, 5 and 8 respectively (adjusted with 0.1M NaOH solution) showed that the pH is the main factor that influences the aggregation of Au particles (the TEM images are not shown here). At high pH value (pH≥6), the Au aggregation behavior is almost insignificant (similar to the treatment with deionized $H_2O$).

Figure 2A:
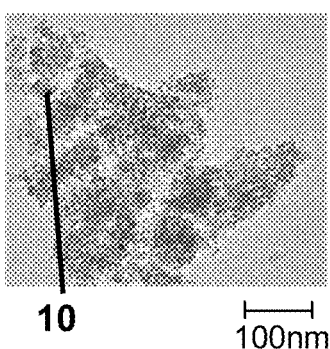
FIGS. 2A, 2B, and 2C are transmission electron microscope (TEM) images showing the effects of treatments of ethylene glycol monoethyl ether (EGME), Fe(NO$_3$)$_3$ and pH value on the Au particles size in the Au/α-Fe$_2$O$_3$ catalyst prepared by the CP method.
Figure 2B:
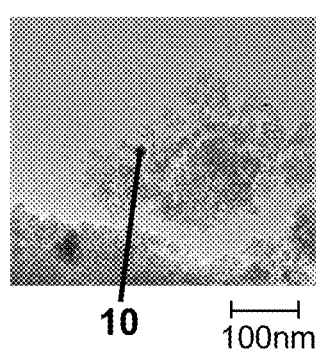
Figure 2C:
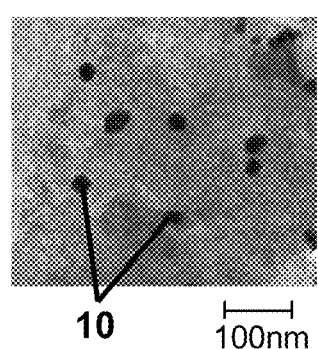

FIGS. 2A, 2B, and 2C are transmission electron microscope (TEM) images showing the effects of treatments of ethylene glycol monoethyl ether (EGME), $Fe(NO_3)_3$ and pH value on the Au particles size in the Au/$\alpha$-$Fe_2O_3$ catalyst prepared by the CP method. FIG. 2A is a TEM image of the 5 wt % Au/$\alpha$-$Fe_2O_3$ supported catalyst before any treatment. FIG. 2B is a TEM image of the 5 wt % Au/$\alpha$-$Fe_2O_3$ supported catalyst treated with $Fe(NO_3)_3$ for 5 hrs, and FIG. 2C is a TEM image of the 5 wt % Au/$\alpha$-$Fe_2O_3$ supported catalyst treated with EGME for 5 hrs. The Au particles are almost invisible in the fresh 5 wt % Au/$\alpha$-$Fe_2O_3$ catalyst in FIG. 2A as some Au species existed as oxidized Au species. After treatment with $Fe(NO_3)_3$ solution, a few big Au particles 10 were formed as shown in FIG. 2B; however, after the treatment with EGME, there was an obvious change for Au particles 10 shown in FIG. 2C. The Au particles were extracted out from the catalyst support and aggregated into big Au particles (30-60 nm in diameter) after the treatment with EGME. A similar phenomenon was observed for the Au/$\alpha$-$Fe_2O_3$ catalyst by the DP method and for the calcined catalysts prepared by the DP and CP methods. These results show that EGME has negative influence on the Au particles.

On the other hand, for the catalysts prepared by the CP and DP method, opposite effects of EGME and $Fe(NO_3)_3$ on the Au particles were observed. The addition of $Fe(NO_3)_3$ had a limited negative effect on Au particle size as shown in FIG. 2B while EGME could extract Au species out from the catalyst support matrix leading to the formation of the big Au particles as shown in FIG. 2C.

The catalytic performances of 5 weight (wt) % Au/$Fe_2O_3$ catalysts prepared by the CP and DP method for WGS reaction before and after treatment with EGME. The reaction conditions were ideal WGS 3.2% CO+19% $H_2O$ (GHSV=8912 h$^{-1}$, Total Flowrate=28 ml/min). The LTS-WGS of CP or DP 5 wt % Au/$Fe_2O_3$ is significantly lowered when treated with EGME alone. This result is important in the latter phase, where scheme 2 of washcoating is used for the monolithic catalysts based on the DP method.

Figure 3A:
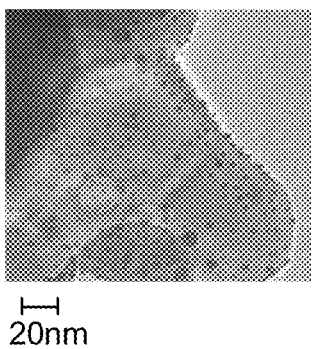
FIGS. 3A, 3B, and 3C are transmission electron microscope (TEM) images showing the influence of various binders on Au particle size and the capability to load powder Au/Fe$_2$O$_3$ catalyst onto a monolith, according to one embodiment.
Figure 3B:
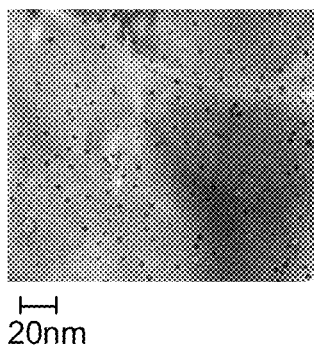
Figure 3C:
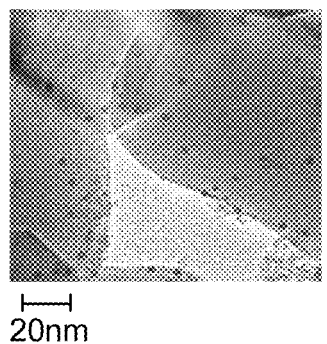

FIGS. 3A, 3B, and 3C are transmission electron microscope (TEM) images showing the influence of various binders on Au particle size and the capability to load powder Au/$Fe_2O_3$ catalyst onto the monolith. Due to the adverse effect of $Fe(NO_3)_3$ on the supported Au catalysts prepared by the sonochemical method, other binders were thus studied. The influence of these various binders on Au particle size and the capability to load powder Au/$Fe_2O_3$ catalyst onto the monolith from various binders are shown in FIGS. 3A, 3B, and 3C and in Table 1. The Al and Ti hydroxides are poor in adhering the powder Au/$Fe_2O_3$ catalyst to the monolith, though they have very limited influence on the Au particle size, while the Fe hydroxide and Fe gluconate can adhere Au/$Fe_2O_3$ particles to the monolith with much improved adherence, as well as the limited influence on the Au particle size. FIG. 3A is a TEM image showing the 5 wt % Au/$\alpha$-$Fe_2O_3$ Fluka catalyst prepared by the sonochemical method before any treatment. FIG. 3B is a TEM image showing the supported Au catalyst after being treated with EGME+$H_2O$+ iron gluconate (used to replace $Fe(NO_3)_3$) for 5 hrs. FIG. 3C is a TEM image showing the supported Au catalyst after being treated with EGME+$H_2O$+freshly prepared $Fe(OH)_3$ for 5 hrs. The observed binder effects are summarized in Table 1.

TABLE 1

| Binders | Influence on Au particle size | Adherence to monolith | Au catalyst loading on monolith |
|---|---|---|---|
| Al and Ti hydroxides | little | poor | low |
| Fe hydroxide | little | good | low |
| Fe gluconate | little | good | good |
| No binder | little | poor | low |

However, using Fe gluconate seemed to result in a dip in the CO oxidation activity as shown in plot in FIG. 4. The CO oxidation activity (1% CO in Air) of 5 wt % Au sono/$Fe_2O_2$ powder, its residue and monolith samples obtained from slurry using Fe Gluconate as the binder were measured. The amount of catalyst used was 50 mg. The reactant flowrate was 20 ml/min. The catalyst was pretreated at 300° C. in air before the reaction.

In FIG. 4, circles 12 show the CO oxidation activity of 1wt % Au/$Fe_2O_3$ Fluka catalyst before any treatment, stars 14 show the CO oxidation activity of 1wt % Au/$Fe_2O_3$ Fluka catalyst EGME+$H_2O$+0.29M iron gluconate stirred for 6 hrs (monolith), squares 16 show the CO oxidation activity of 1 wt % Au/$Fe_2O_3$ Fluka catalyst EGME+$H_2O$+0.29M iron gluconate stirred for 6 hrs (washcoat residue).

For the CO oxidation reaction of 1% CO in air, the Au/$\alpha$-$Fe_2O_3$ powder catalyst prepared by the sonochemical method was found to have the same level of activity as that of commercially available Au/$\alpha$-$Fe_2O_3$ catalyst. However, the catalytic performance of the monolithic Au catalyst prepared by Scheme 1 using EGME and $Fe(NO_2)_2$ for CO oxidation reaction for 1% CO in air is a little lower (10-15%) than that of the powder catalysts. This is most probably due to the aggregation effect caused by $Fe(NO_2)_2$ such as shown in FIG. 1C. At low flowrates, there is no obvious decrease in catalytic activity (specific activity) for the powder and the monolithic catalysts within 400 hrs. At higher flow rates, after 400 hrs reaction, 77-80% of the specific activity was still maintained and the loss in activity was easily resumed by re-activation in air. This regeneration process can be repeated many times.

It is noted that the monolithic catalyst exhibited similar catalytic behavior to the powder catalyst after the 400 hrs reaction, indicating the stability of the monolithic catalyst is even better than that of the powder catalyst. These results suggest that the monolithic catalyst is able to oxidize CO at low temp for some practical application, e.g., for indoor environmental removal of CO and some other pollutants.

In view of some disadvantages as a consequence of the use of binders, a two-stage process, without the use for such materials, was then developed for the preparation of the washcoated ML catalyst, which makes use of the successful procedures of using EGME and $Fe(NO_3)_3$ to first washcoat a layer of $Fe_2O_3$ onto the wall of ML. The $\alpha$-$Fe_2O_3$ pre-washcoated monolith has a much better adhering ability towards the Au/$Fe_2O_3$ powder. Freshly prepared and undried Au/$Fe_2O_3$ catalyst, which has rich OH groups on surface, was then used to coat the pre-washcoated $Fe_2O_3$/ML as a $2^{nd}$ layer, with the assistance of EGME (for sonochemically prepared catalysts) or water (for DP prepared catalysts) (Scheme 2).

This method can washcoat Au/$Fe_2O_3$.$ZrO_2$ catalyst with acceptable adherence and has very limited influence on the Au particle size. The comparison of CO oxidation catalytic activity of the 5 wt % Au/$\alpha$-$Fe_2O_3$ powder catalyst prepared by the sonochemical method, and its washcoated monolithic catalyst prepared by the 2-stage method (scheme 2) are shown in FIG. 5, at low and high flow rates. 75 mg of catalyst were used. Hollow circles 18 show ML stability at $GHSV^{-1}$=6719 hrs. Hollow diamonds 20 show Au powder catalyst stability at $GHSV^{-1}$=6719 hrs. Solid circles 24 show ML stability at $GHSV^{-1}$=679 hrs. Solid diamonds 22 show Au powder catalyst stability at $GHSV^{-1}$=679 hrs. The specific activities are comparable and almost similar to one another.

Figure 6A:
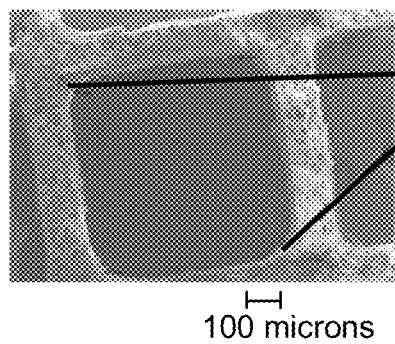
FIGS. 6A, 6B, and 6C are cross sectional scanning electron microscope (SEM) images of a Au/(Fe$_2$O$_3$.ZrO$_2$)-(α-Fe$_2$O$_3$)/ ML catalyst, according to one embodiment.
Figure 6B:
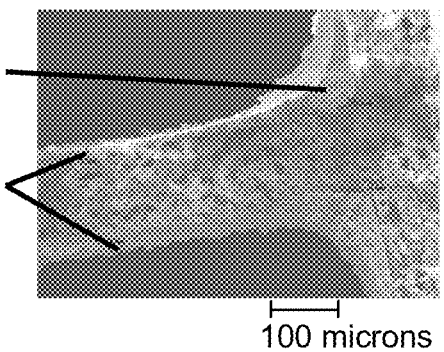
Figure 6C:
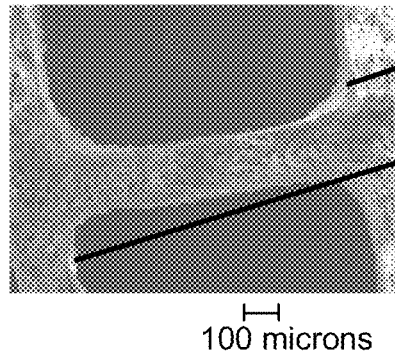
Figure 6D:
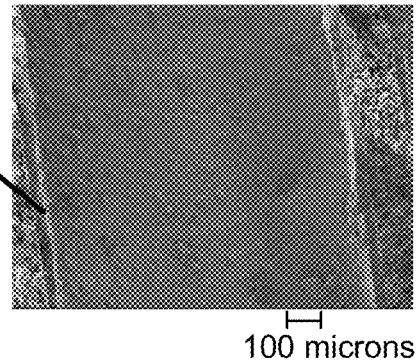
FIG. 6D is a planar view along a channel of a Au/(Fe$_2$O$_3$.ZrO$_2$)-(α-Fe$_2$O$_3$)/ML catalyst, according to one embodiment.

SEM images of the washcoated Au/($Fe_2O_3$.$ZrO_2$)-($\alpha$-$Fe_2O_3$)/ML catalyst after the aging test (in FIG. 5) are shown in FIGS. 6A, 6B, 6C, and 6D. FIGS. 6A, 6B, and 6C show the cross sectional view; FIG. 6D shows the planar view along one of the channels. The 5 wt % Au/$\alpha$-$Fe_2O_3$ catalyst was prepared by the sonochemical method. The powder catalyst was homogeneously coated onto the monolith, and the thickness at the corner 26 was in the range of from 50 microns to 70 microns, while the thickness at the wall area 28 was in the range of from 10 microns to 15 microns.

Figure 7:
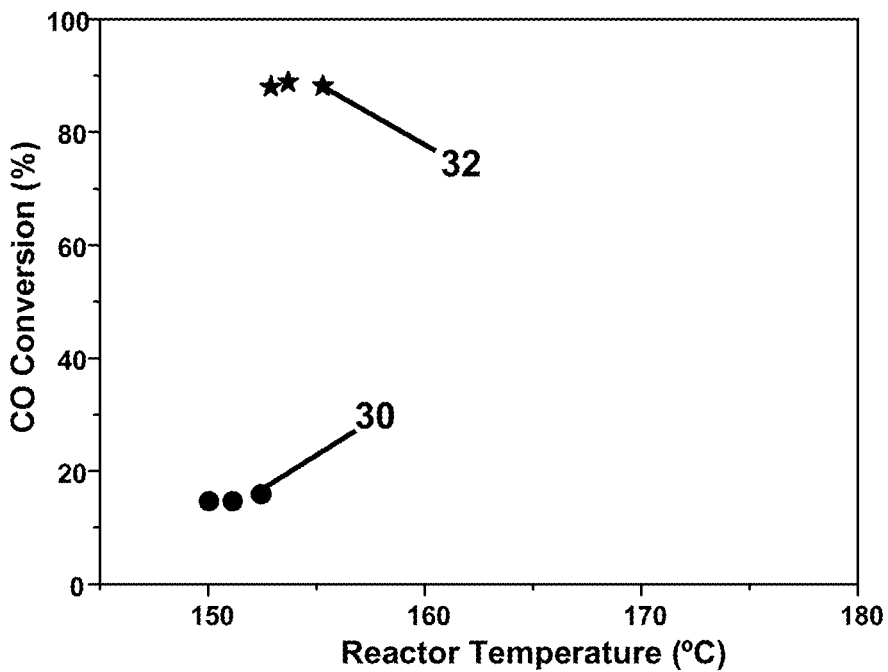
FIG. 7 For the LT-WGS reaction, it was found that the Au/α-Fe$_2$O$_3$ nanofiber catalyst (powder) exhibited much higher catalytic activity than the Au/α-Fe$_2$O$_3$-Fluka catalyst as shown by the plot.

For the LT-WGS reaction, it was found that the Au/$\alpha$-$Fe_2O_3$ nanofiber catalyst (powder) exhibited much higher catalytic activity than the Au/$\alpha$-$Fe_2O_3$-Fluka catalyst as shown by the plot in FIG. 7. The catalysts were prepared by the DP method. The catalyst activity was much higher when the $\alpha$-$Fe_2O_3$ nanofibers catalyst were used as the support (refer to the Detailed Description section d) for synthesis process). The catalyst test conditions were as follows: amount of the catalyst: 130 mg, GHSV=8912 $h^{-1}$, and total flowrate=28 ml/min.

The ideal WGS gas composition of the dry composition was 4.5% CO+95.5% Helium and wet composition is 3.2% CO+19% $H_2O$ in Helium. In FIG. 7, circles 30 show the catalytic activity of 5 wt % Au/$\alpha$-$Fe_2O_3$ Fluka powder. Stars 32 show the catalytic activity of 5 wt % Au/$\alpha$-$Fe_2O_3$ nanofiber catalyst. At 160° C., the CO conversion could reach 90% on the former, while that of the latter was only 50%. This WGS activity is almost the same level that the commercially available Fe—Cr WGS catalyst achieved above 200° C. to 300° C. under the same experimental conditions. Therefore, it is possible to lower the reaction temperature by using supported gold catalysts in the LT-WGS reaction. In the synthesis of the catalyst support ($\alpha$-$Fe_2O_3$ nanofibers), tetraethylammonium hydroxide (TEAOH) was used as the template. The same procedure was extended to prepare the $\alpha$-$Fe_2O_3$ nanofibers using tetramethylammonium hydroxide (TMAOH) as the template but at room temperature. Therefore, the synthesis of the $\alpha$-$Fe_2O_3$ nanofibers is easily scalable. The surface area of the $\alpha$-$Fe_2O_3$ nanofibers is in the range of 120-140 $m^2$/g, while that of the $\alpha$-$Fe_2O_3$-Fluka (commercial) is about 20 $m^2$/g.

Though the Au/$\alpha$-$Fe_2O_3$ nanofiber catalysts have high initial activity, they lost their stability continuously with time during the reaction. The main reason for the decrease in activity could be due to the loss of the surface area of the $Fe_2O_3$ support under the WGS reaction conditions. The addition of $ZrO_2$ into the catalyst support stabilizes the $\alpha$-$Fe_2O_3$ surface area, the formed $Fe_3O_4$ phase (formed in the reaction) and the small Au particles (see T. Tabakova, V. Idakiev, D. Andreeva, I. Mitov, Appl. Catal., A, 202 (2000), 91-97). A Zr precursor was added into the reaction mixture and obtained much enhanced LTS-WGS catalytic stability for the Au/$Fe_2O_3$.$ZrO_2$ catalyst. The catalyst test conditions were as follows: amount of the catalyst: 130 mg, GHSV=8912 $h^{-1}$, and total flowrate=28 ml/min. The ideal WGS gas composition dry was 4.5% CO+95.5% Helium. The ideal WGS gas composition wet was 3.2% CO+19% $H_2O$ in Helium.

Figure 8:
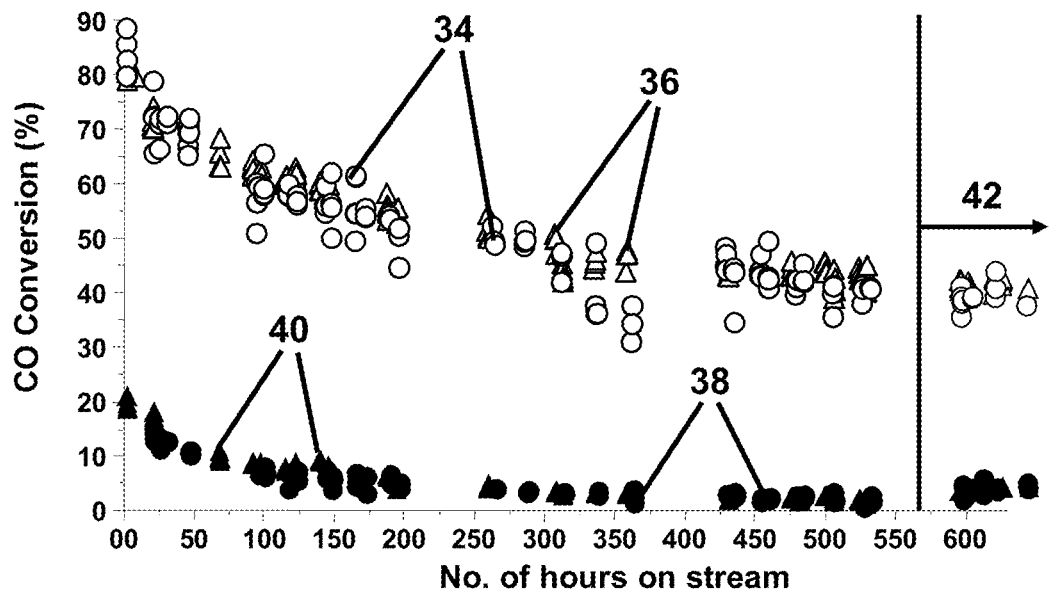
FIG. 8 is a plot showing the corresponding activity data and stability profile of 3% Au/Fe$_2$O$_3$.ZrO$_2$ powder and monolithic catalysts, according to one embodiment.

FIG. 8 is a plot showing the corresponding activity data and stability profile of 3 wt % Au/$Fe_2O_3$.$ZrO_2$ powder and monolithic catalysts, according to one embodiment. The 3 wt % Au/$Fe_2O_3$.$ZrO_2$ catalyst monolith was prepared via Scheme 2. The Au was deposited via the DP method (refer to section b of Detailed Description), and the catalyst support was prepared by the method described in the Detailed Description section d), using water in place of EGME, due to its negative influence on the DP catalysts. The 3 wt % Au/$Fe_2O_3$.$ZrO_2$ monolith showed very similar catalytic performance to its powder catalyst as shown in the plot in FIG. 8. Hollow circles 34 show the catalytic performance of the powder catalyst at a GHSV=815 $hr^{-1}$. Hollow triangles 36 show the catalytic performance of the monolith catalyst at a GHSV=815 $hr^{-1}$. Solid circles 38 show the catalytic performance of the powder catalyst at a GHSV=8260 $hr^{-1}$. Solid triangles 40 show the catalytic performance of the monolithic catalyst at a GHSV=8260 $hr^{-1}$. It should be pointed out that, due to the porous structure of the monolith, the monolithic catalyst has a much larger volume than the same amount of the powdered Au catalyst. Therefore, with the same amount of the loaded Au catalyst into the channels of a blank monolith (of similar volume to that of the monolithic catalyst) and the same flow rate of the reactant gas, the calculated gas hourly space velocities (GHSV) used were 815 $hr^{-1}$ and 8260 $hr^{-1}$ respectively. The data to the right of arrow 42 shows catalytic performance after 1 hr of regeneration in He at 300° C.

The advantages of these Au/$Fe_2O_3$.$ZrO_2$/ML catalyst include the lower reaction temperature than that of the Fe—Cr catalyst at the same level of CO conversion, the improved catalytic stability after doping $ZrO_2$, as well as the ability to obtain the catalytic ability without special activation. As presented in FIG. 8, after 400 hrs, the CO conversion was around 45%. After 600 hrs of reaction, the CO conversion was around 40%. The last property is important to fuel cell applications, as the WGS reactor using the Au catalyst can be easily switched on and off without influencing the catalytic performance.

An improved LT-WGS activity was realized by using a modified synthesis method for Au/$Fe_2O_3$.$ZrO_2$ (the synthesis method is shown in the Detailed Description section e)). The catalytic activity remained above 60% even after almost 400 hrs of reaction, compared to the previous value of 40% for the same amount of time on stream.

Figure 9A:
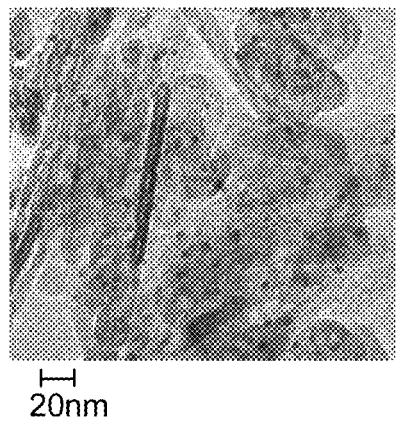
FIGS. 9A and 9B are TEM images of the 3% Au/Fe$_2$O$_3$.ZrO$_2$ powder catalyst prepared by the DP method, before the LT-WGS reaction and after the LT-WGS reaction, respectively.
Figure 9B:
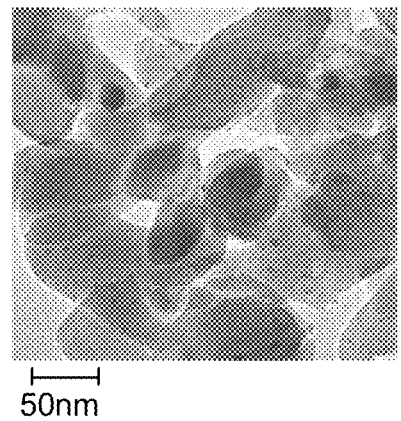
Figure 9C:
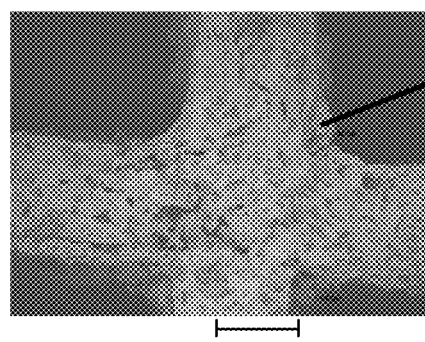
FIGS. 9C and 9D are SEM images of the 3% Au/Fe$_2$O$_3$.ZrO$_2$ monolithic catalyst, according to one embodiment, after the stability test described in FIG. 5.
Figure 9D:
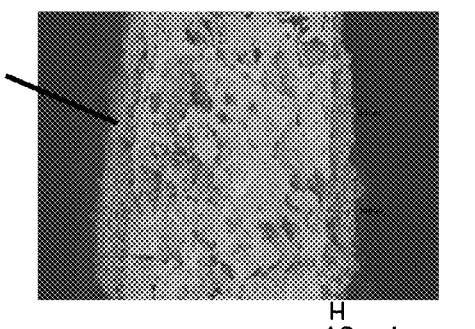

FIGS. 9A and 9B are TEM images of the 3 wt % Au/$Fe_2O_3$.$ZrO_2$ powder catalyst prepared by the DP method. FIG. 9A is before the LT-WGS reaction and FIG. 9B is after the LT-WGS reaction. The images show that 70-80% of the Au particles retained the small size and were highly dispersed, but the morphology of the catalyst support changed significantly. FIGS. 9C and 9D are SEM images of the 3 wt % Au/$Fe_2O_3$.$ZrO_2$ monolithic catalyst after the stability test described in FIG. 5. The supported Au catalyst 44 on the ML was still intact and well adhered to its wall after the aging test.

XRD results revealed that the $Fe_2O_3$.$ZrO_2$ support was mainly of tetragonal $ZrO_2$ and $\alpha$-$Fe_2O_3$. After the WGS reaction, trace of $Fe_3O_4$ was generated. The surface area of the support before and after (the powder catalyst) the WGS test was 140 and 118 $m^2$/g respectively.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. An article comprising:
a ceramic monolith; a washcoat layer disposed on the monolith; and a supported Au catalyst layer disposed on the washcoat layer, wherein the supported Au catalyst layer comprises Au particles supported on a support comprising iron oxide nanofibers doped with a second metal oxide, wherein the second metal oxide is zirconia oxide.

2. The article according to claim 1, wherein the monolith comprises cordierite.

3. The article according to claim 1, wherein the monolith comprises a honeycomb structure.

4. The article according to claim 1, wherein the Au particles have an average diameter of 10 nm or less.

* * * * *